H. G. STOTT.
OVERSPEED DEVICE FOR DYNAMO ELECTRIC MACHINES.
APPLICATION FILED APR. 5, 1907.

1,062,052.

Patented May 20, 1913.

2 SHEETS—SHEET 1.

WITNESSES:
Fred H. Miller
R. J. Dearborn

INVENTOR
Henry G. Stott
BY
Keeley G. Carr
ATTORNEY

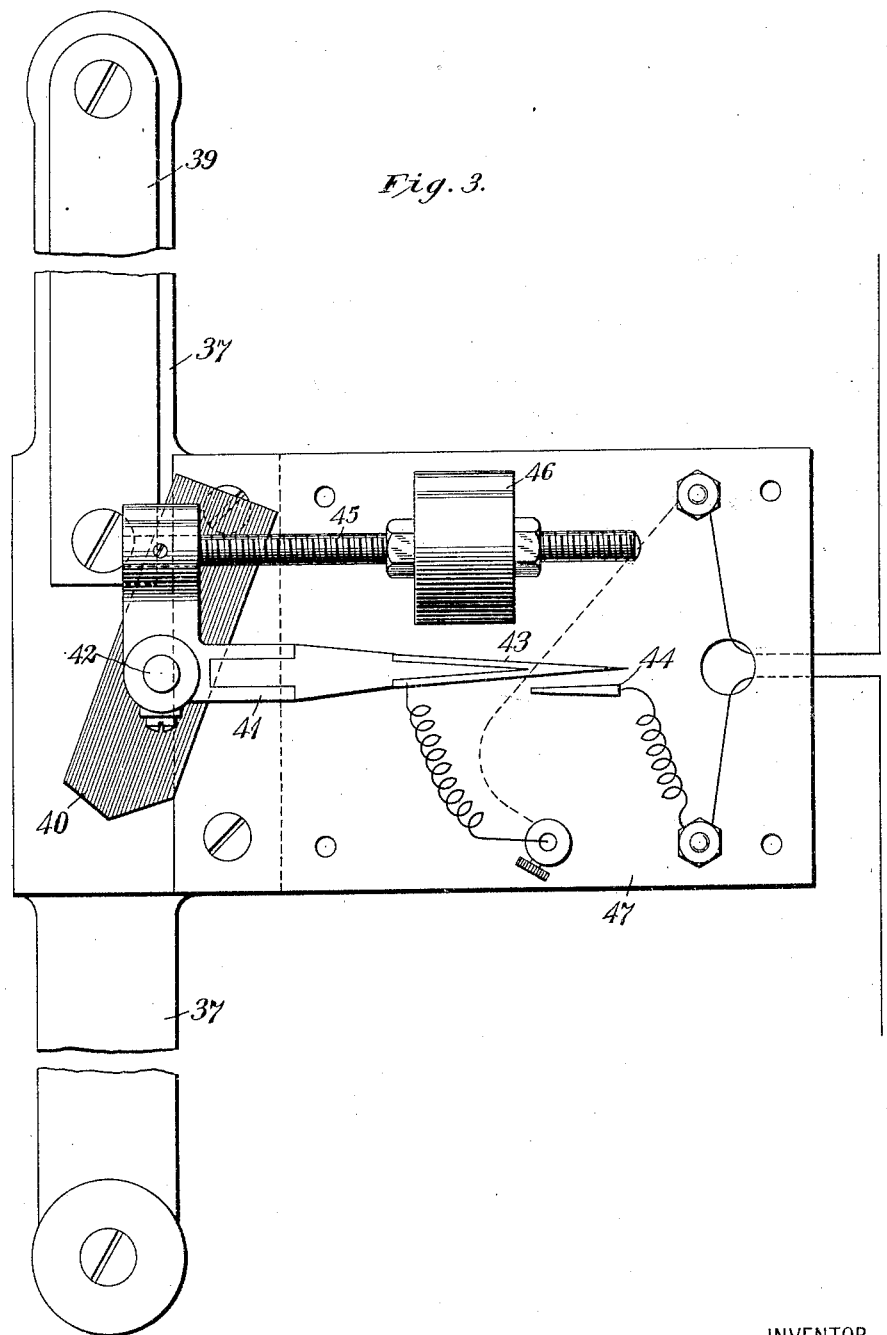

UNITED STATES PATENT OFFICE.

HENRY G. STOTT, OF NEW YORK, N. Y., ASSIGNOR TO WESTINGHOUSE ELECTRIC & MANUFACTURING COMPANY, A CORPORATION OF PENNSYLVANIA.

OVERSPEED DEVICE FOR DYNAMO-ELECTRIC MACHINES.

1,062,052.  Specification of Letters Patent.  Patented May 20, 1913.

Application filed April 5, 1907. Serial No. 366,498.

*To all whom it may concern:*

Be it known that I, HENRY G. STOTT, a citizen of the United States, and a resident of New York, in the county of New York and State of New York, have invented a new and useful Improvement in Overspeed Devices for Dynamo-Electric Machines, of which the following is a specification.

My invention has reference to the speed limitation and circuit control of dynamo-electric machines, and it has for its object to provide means, dependent upon a material diminution in the field strength, for automatically interrupting the supply circuits of such machines as are connected to direct current sources of electric energy.

Direct current motors and rotary converters are liable to run away or to operate at dangerously high speeds if their fields become abnormally weakened and, consequently, it is desirable to provide means for automatically interrupting the direct current circuits from which they may receive energy in case their rotating parts exceed predetermined speeds. Centrifugally operated switches have usually been employed for this purpose in the prior art. These devices are more or less unreliable and are, of course, dependent, as to operation, upon the speed of the rotating part of the machine to which they are attached.

I provide a device which I designate as a magnetic relay which performs substantially the same function as the centrifugal switches of the prior art, but it is dependent directly upon the weakened field in the dynamo instead of being dependent upon the increased speed of the rotating member which is the result of this cause.

Figure 1:
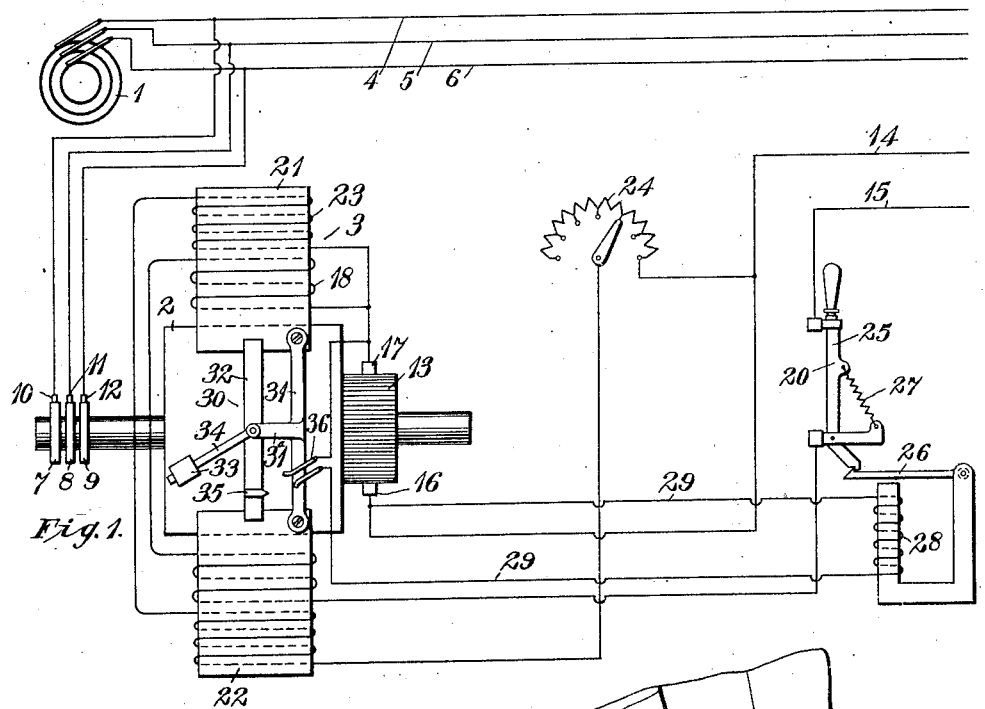
Figure 2:
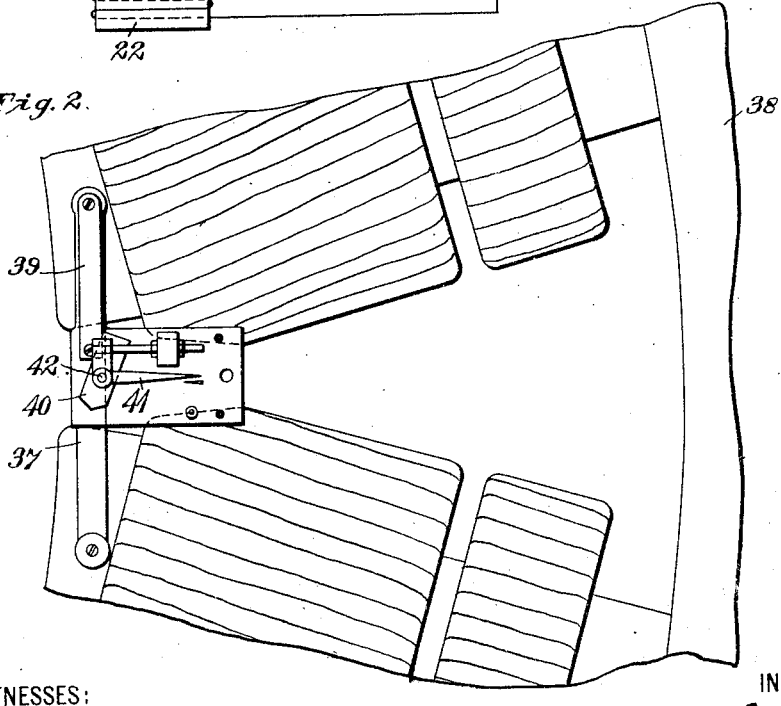

Figure 1 of the accompanying drawings is a diagrammatic view of a system of electric distribution embodying my invention, and Figs. 2 and 3 are illustrative of a modified form of magnetic relay which is well adapted for general application to the field magnets of the most modern rotary converters.

Referring to Fig. 1 of the drawings, alternating current electrical energy is supplied from an alternating current generator 1 to the rotating member 2 of a rotary converter 3, through line conductors 4, 5 and 6 and collector rings 7, 8 and 9, which are engaged by stationary contact brushes 10, 11 and 12. The rotary converter is equipped, in an ordinary manner, with a commutator cylinder 13 from which direct current energy is supplied to a circuit 14—15, through stationary contact brushes 16 and 17, a series field magnet winding 18 and a circuit interrupter 20. Field magnet pole pieces 21 and 22 of the rotary converter are provided with shunt windings 23 in series with which is connected a variable resistance 24.

The circuit interrupting device 20 comprises a movable switch arm 25 which is held in a closed position, in opposition to an opening spring 27, by means of a latch 26. The latch 26 may be released when an electro-magnet 28 is energized and the winding for this magnet is included in an interrupted circuit 29 which is connected across the direct current circuit 14—15, but which may be supplied with energy from any suitable source, such as the direct current circuit of the rotary converter.

The rotary converter 3 is provided with a magnetic relay 30 comprising a non-magnetizable frame 31 which is attached to the tips of the field magnet pole pieces 21 and 22, a magnetizable bar 32 which is pivoted substantially at its middle point to a projection 31ᵃ of the frame 31, and a counter weight 33. The counter weight 33 is adjustably mounted upon a projection 34 of the bar 32 and the arrangement of parts is such that, under normal conditions of field strength, the position of equilibrium for the movable part is materially different from that which obtains when the field strength of the machine is weakened.

In the weak-field position of the relay, the circuit 29 is completed by means of a contact member 35 upon the magnetizable bar 32 and stationary contact members 36 which are connected to the terminals of the interrupted circuit. The degree of diminution in field strength which is required to effect the completion of the tripping circuit depends upon the position of the weight 33 on the arm 34.

Upon the completion of the circuit 29, the magnet 28 is energized and the latch 26 tripped so that the switch 20 is opened and the circuit 14—15 interrupted. It will, of course, be readily understood that the speed of the rotary converter will not be materially increased above its normal value after its direct current circuit connections are interrupted. As illustrated in Figs. 2 and 3, the magnetic relay comprises a bar or frame 37 which is attached to two adjacent field magnet pole pieces of a multi-polar dynamo-electric machine 38, a magnetizable strip 39 which is attached to one end of the bar 37, a relatively short magnetizable block 40 and a bell-crank lever 41, and a rotatable shaft 42 upon which the block 40 and the lever 41 are mounted. One arm of the bell-crank lever 41 is provided with a movable contact member 43 which is adapted to engage a stationary contact member 44, and the other arm of the lever supports a screw-threaded rod 45 on which a weight 46 is adjustably mounted. An insulating plate or slab 47 is attached to the non-magnetizable bar 37 and serves as a terminal board for the interrupted circuit which may be completed when the contact member 43 engages the contact member 44. The magnetizable strip 39 so directs a portion of the magnetic flux that the magnetizable block 40 acts in opposition to the weight 46 and thereby normally holds the contact members 43 and 44 out of engagement.

The operation of this device will be readily understood from the description of the system shown in Fig. 1, the block 40 and the magnetizable bar 32 having like functions, and the contact members 43 and 44 performing the same work as contact members 35 and 36.

It will be understood that other modifications may be made within the spirit and scope of my invention.

I claim as my invention:

1. In a system of distribution, the combination with a direct current circuit, a dynamo-electric machine connected thereto, and an interrupting device for said circuit, of a magnetizable member pivotally mounted between two adjacent pole pieces of the field magnet of the machine and provided with means for automatically closing the tripping circuit of the interrupting device upon a material reduction in the magnetic leakage flux between said adjacent field magnet pole pieces.

2. The combination with the field magnet of a dynamo-electric machine, of a relay contact member, a magnetizable block and an adjustable counter-weight rigidly connected together and pivotally mounted between two adjacent pole pieces of said machine, and a relay contact terminal with which said contact member engages when said counter-weight overcomes the force exerted by the magnetic field.

3. The combination with the field magnet of a dynamo-electric machine, and a magnetizable body pivotally supported between two adjacent pole pieces of said field magnet and provided with an adjustable counter-weight and a contact member, of a stationary contact member which is engaged by the movable contact member when the counter-weight overcomes the force exerted upon the magnetizable body by the magnetic field.

4. The combination with a dynamo-electric machine, of a stationary frame supported by the field magnet of said machine, a magnetizable strip located in the path of a magnetic flux of said field magnet, a magnetizable block rotatably mounted on said frame adjacent to said strip, an interrupter in the armature circuit of said machine, a stationary contact terminal for the tripping coil circuit of said interrupter, an arm projecting from the magnetizable block and having a contact terminal that is held in open-circuit position by a normal magnetic flux through said strip and said block, and a weight adjustably mounted on said arm for effecting engagement between the contact terminals to close the tripping circuit when the magnetic flux through the strip and the block is decreased a predetermined amount.

In testimony whereof, I have hereunto subscribed my name this 21st day of March, 1907.

HENRY G. STOTT.

Witnesses:
 THOMAS GEREHART,
 JAMES F. SMITH.